June 25, 1946.    V. GIER    2,402,884
DISK HARROW
Filed April 17, 1944    2 Sheets-Sheet 1

INVENTOR
Virgil Gier
ATTYS

June 25, 1946.  V. GIER  2,402,884
DISK HARROW
Filed April 17, 1944   2 Sheets-Sheet 2
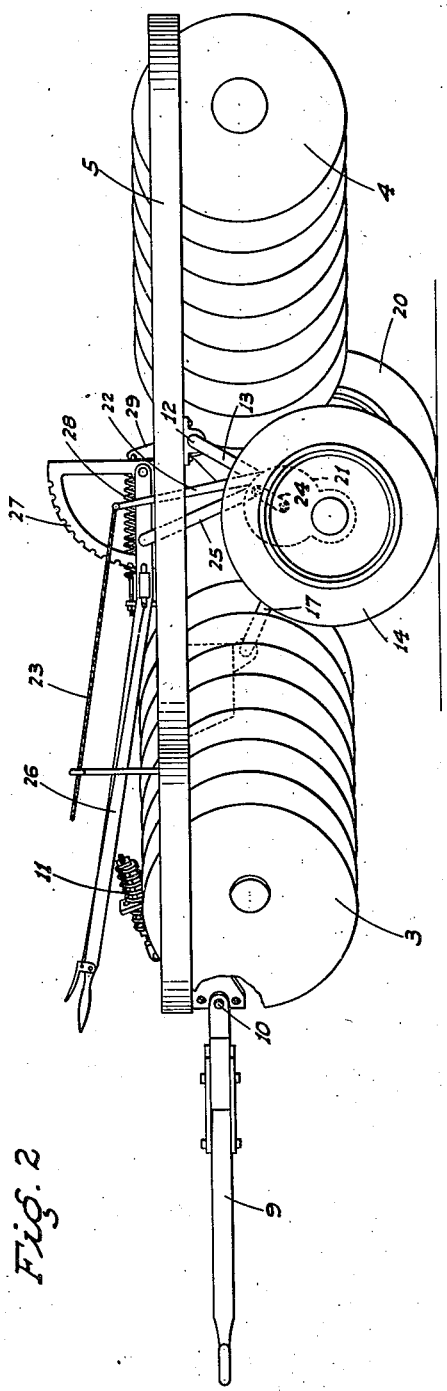
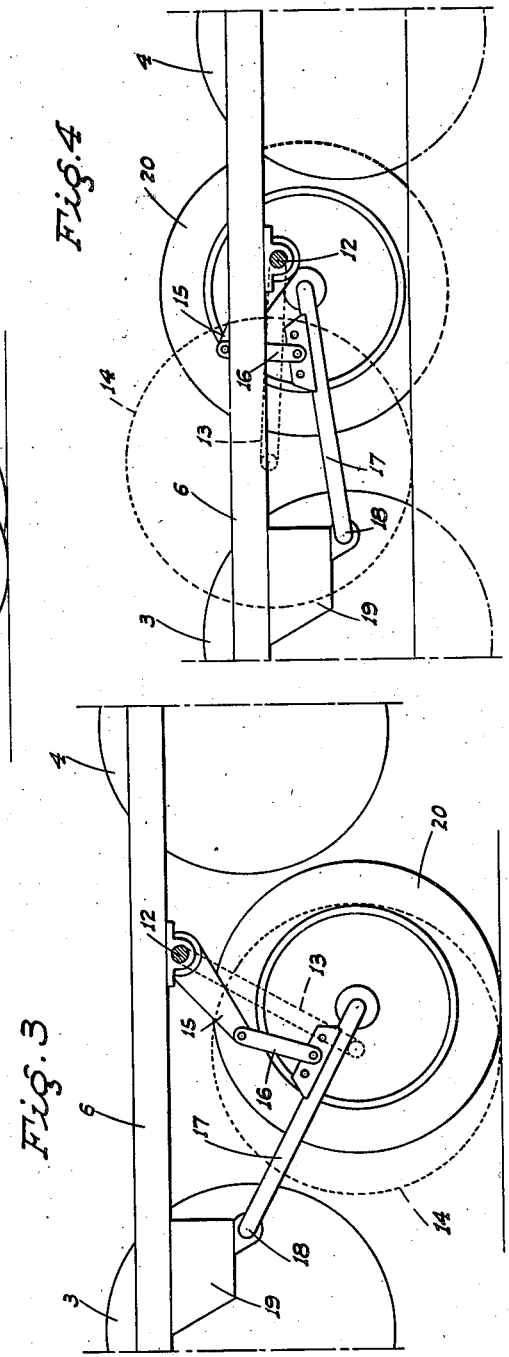
INVENTOR
Virgil Gier
ATTYS

Patented June 25, 1946

2,402,884

UNITED STATES PATENT OFFICE 2,402,884

DISK HARROW

Virgil Gier, Turlock, Calif.

Application April 17, 1944, Serial No. 531,386

7 Claims. (Cl. 55—73)

This invention relates in general to improvements in disk harrows, and in particular disk harrows of the type which include a pair of disk gangs connected in tandem relation as a unit.

One of the objects of the present invention is to provide, in combination with a tandem gang disk harrow, a wheel assembly including a pair of transversely spaced wheels, and means to lower said wheels from a normally raised position relative to the gangs, whereby to readily lift the harrow from the ground when making turns at the end of a row or field, or for transport from place to place.

Another object of this invention is to provide a disc harrow and wheel assembly combination, as in the preceding paragraph, in which said wheel assembly is constructed so that when in relatively raised position the wheels ride the ground and control the cutting depth of the disk gangs, one wheel riding at a lower horizontal plane than the other and in a furrow as a guide means for the implement; the wheel lowering means being operative to lower said wheels different distances relative to the harrow so as to axially aline said wheels when in lowered position and to then maintain the harrow horizontal for transport.

A further object of this invention is to provide a disk harrow which includes dual, disk gangs disposed in angled relation to each other and to the line of draft; the individual disks of the trailing gang being disposed for forward movement in longitudinal paths centrally between the longitudinal paths of the disks of the leading gang. This relative arrangement of the discs of the leading and trailing gangs produces a more effective cultivating or disking action, and with a minimum of ridges left in the field.

A further object of the invention is to produce a simple and inexpensive device, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 2 is an end view of the implement in transport position.

Figure 3 is a diagrammatic fragmentary cross section on line 3—3 of Fig. 1, enlarged, showing the furrow engaging wheel in relatively lowered or transport position.

Figure 4 is a similar view, but with the harrow in working position and said wheel riding in a furrow.

Figure 1:
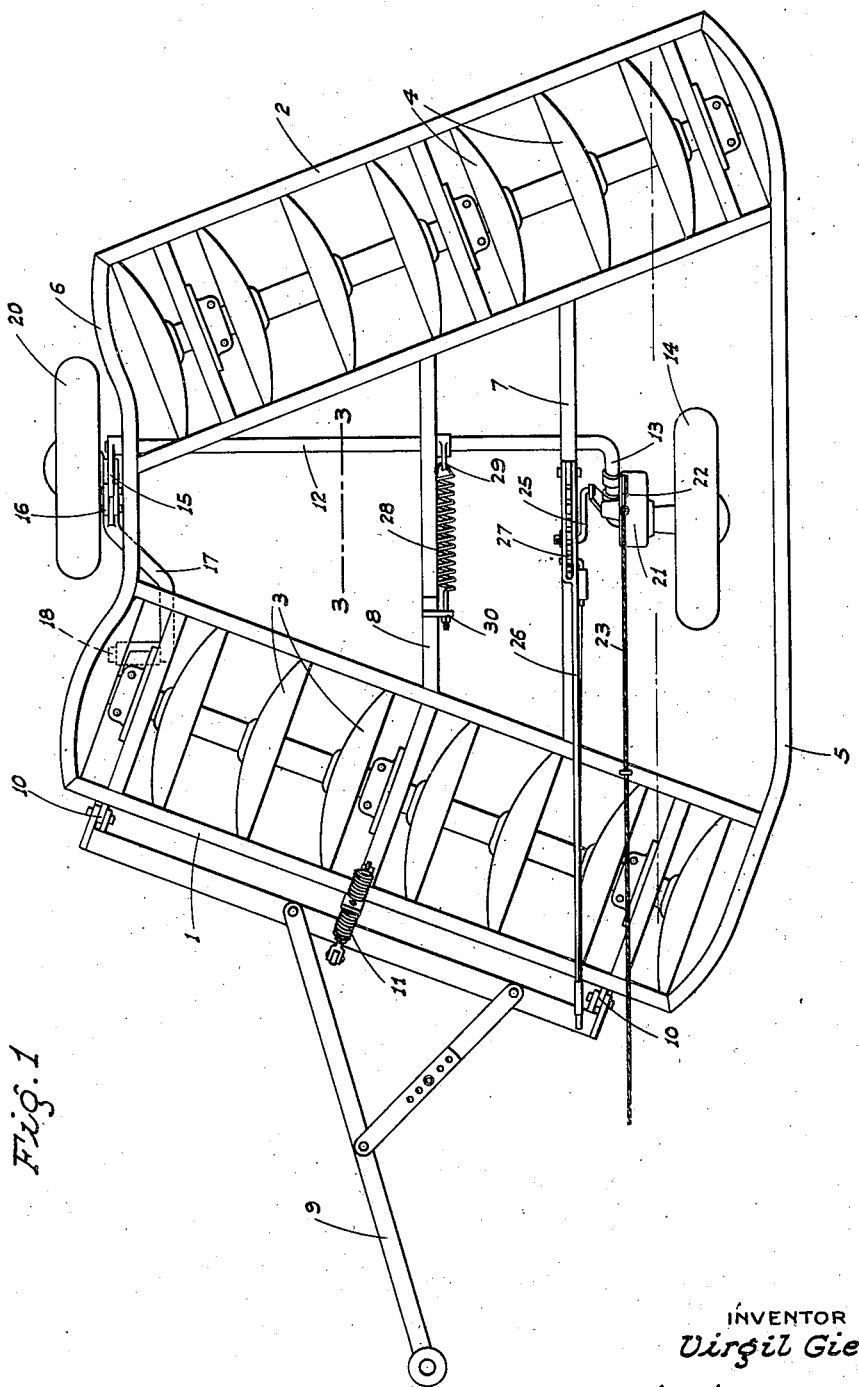
Figure 1 is a top plan view of the implement.

Referring now more particularly to the characters of reference on the drawings, the implement comprises a leading disk gang 1 and a trailing disk gang 2; the disks 3 and 4 of the leading and trailing gangs, respectively, facing in opposite directions. The gangs 1 and 2 are angled relative to each other and to the line of draft, and are permanently connected in such relation to each other by rigid frame members 5 and 6 at the opposite ends of the gangs and intermediate frame members 7 and 8 disposed in spaced parallel relation.

The implement is adapted for connection to a tractor by means of a vertically swingable draft unit 9 pivotally connected at its rear end to the leading gang 1 at transversely spaced points 10. A spring unit 11 connected between the frame of the leading gang 1 and the draft unit 9 counterbalances the latter.

The disks 4 of the trailing gang 2 are disposed so that they travel in longitudinal paths centrally between the longitudinal paths of the disks 3 of the leading gang 1. By reason of this relative arrangement of the disks between the respective gangs, a very effective cultivating or disking action is obtained, with a minimum of ridges being left in the field.

The above described implement includes, in combination therewith, a wheel assembly which comprises the following:

A cross shaft 12 is disposed beneath and extends between the frame members 6 and 7, projecting at its ends slightly beyond adjacent ones of said frame members. At the end adjacent the frame member 7, the shaft 12 is formed with a forwardly and downwardly projecting crank arm 13 having a wheel 14 turnably mounted on the lower end thereof; said wheel 14 thus being disposed laterally inwardly from the frame member 5 and between the leading and trailing gangs.

At the other end the cross shaft 12 is fitted with a relatively short radial lever 15 disposed at a forward and downward incline; said lever being pivotally connected at its outer end with the upper end of a relatively short connecting link 16, which is pivotally and adjustably attached at its lower end to a crank arm 17. The crank arm is of substantial length and extends at a rearward and downward incline from a pivotal connection, as at 18, with a block 19 fixed in connection with the leading gang 1 at the end adjacent the frame member 6. A wheel 20 is turnably mounted on the crank arm 17 at its lower end and laterally out from the frame member 6. When the harrow is in use the wheel 20 is run, as a guide, in a furrow, as illustrated diagrammatically in Fig. 4, and consequently at such time the wheel 20 is disposed in a lower horizontal plane than the wheel 14. When it is desired to transport the harrow, the cross shaft 10 is rotated by the power means, as hereinafter described, in a direction to swing the crank arm 13 and radial lever 15 downwardly a predetermined distance. When this occurs the wheel 20 lowers a lesser distance relative to the disk gang than the wheel 14; the lesser lowering movement of the wheel 20 being accomplished by means of the assembly of lever 15, link 16, and crank arm 17. In other words, this lever and link assembly accomplishes a reduction in the extent of the throw of crank arm 17 relative to the crank arm 13. Such lever and link assembly is adjusted so that when the wheels 14 and 20 are in lowered or transport position, they are in axial alinement, as shown in Figs. 2 and 3.

The cross shaft 12 is rotated in a wheel lowering direction by means of a power lift 21 of conventional construction connected between the wheel 14 and crank arm 13, such power lift being energized from said wheel, and controlled by an upstanding lever 22 to which is attached a pull cord 23 leading forwardly to a point on the tractor adjacent the operator's seat. The power lift 21 includes a crank lever 24 pivotally connected by a link 25 with a normally fixed point on the harrow frame. Such point is here shown as constituting an adjustable hand lever 26 normally latched to a quadrant 27.

The hand lever 26 is employed to control the maximum raising movement of the wheels relative to the disk gangs, so as to control the cutting depth of the latter. A tension spring 28 is connected between an upstanding radial lever 29 on cross shaft 12, and an anchor 30 on frame member 8; such spring counterbalancing relative vertical adjustment of the wheels and gangs.

When the wheels 14 and 20 are fully lowered, the disk gangs are elevated a substantial distance above the ground for transport, and the harrow is then horizontally disposed, as clearly shown in Fig. 2.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A supporting wheel assembly for a tandem disk harrow having leading and trailing gangs spaced apart lengthwise of the implement and connected together in unitary relation; said supporting wheel assembly comprising a pair of transversely spaced wheels disposed intermediate the disk gangs, a pair of pivotally mounted, downwardly extending crank arms secured to the harrow, for swinging movement lengthwise thereof, the wheels being turnably mounted on said arms, and means to simultaneously swing said arms to raise or lower the wheels relative to the disk gangs, and to then retain the wheels in a fixed position; the wheels normally being raised and occupying positions in different horizontal planes, and said means including a rotatable cross shaft on the harrow, one of said crank arms being rigid with the adjacent end of the cross shaft and carrying the uppermost one of said offset wheels, a radial lever on the cross shaft adjacent its other end, and a link pivotally connected between the radial lever and the other crank arm, and means to rotate said cross shaft, said lever and link assembly being arranged so that upon rotation of the cross shaft in a direction to lower the wheels, there will be a lesser throw of said other crank arm relative to the throw of said first named crank arm whereby to cause said wheels to occupy substantially the same horizontal plane.

2. A supporting wheel assembly for a tandem disk harrow having leading and trailing gangs spaced apart lengthwise of the implement and connected together in unitary relation; said supporting wheel assembly comprising a pair of transversely spaced wheels disposed intermediate the disk gangs, a pair of downwardly extending crank arms on which said wheels are turnably mounted, a rotatable cross shaft on the harrow, one crank arm being fixed on one end of the cross shaft, the other crank arm being pivoted on the harrow separate from said cross shaft, a radial lever on the cross shaft above said other crank arm, a link pivotally connected between the lever and said other crank arm intermediate the ends of the latter, the wheels being normally relatively raised and the wheel on said one crank then being upwardly offset relative to the other wheel, and means including a wheel actuated power lift operative to cause rotation of said cross shaft in a wheel lowering direction; said lever and link assembly being arranged to cause a lesser throw of said other crank arm and to axially aline said wheels when lowered.

3. A structure as in claim 2 in which said means includes a crank on the power lift, and a link connected between said crank and a normally fixed member on the harrow.

4. A structure as in claim 2 in which said means includes a crank on the power lift, and a link connected between said crank and a normally fixed member on the harrow, said member being an adjustable hand lever.

5. A supporting wheel assembly for a disk harrow which comprises a frame and soil working elements carried by said frame; said assembly comprising a shaft journaled in the frame transversely of the line of draft of the harrow, a crank arm on one end of the shaft, a ground engaging wheel journaled on the free end of said crank arm, a second crank arm pivoted on the frame and projecting toward the shaft, a lever on the shaft spaced from the second named crank arm, a link connecting the lever with the second named crank arm, a ground engaging wheel mounted on the second named crank arm, and means mounted on the frame and connected with the shaft and operable to turn the shaft to raise and lower the crank arms.

6. A device as in claim 5 including a second radially extending lever on the shaft, and a counterbalancing tension spring interposed between said last lever and said frame.

7. A supporting wheel assembly for a disk harrow which comprises a frame and soil working elements carried by said frame; said assembly comprising a pair of wheels adapted to sustain the weight of the frame and working elements when the working elements are in the soil, said wheels then engaging the ground in different relative horizontal planes, and means to move both wheels downwardly relative to the frame whereby to move the frame upwardly and free the working elements from the ground, such latter means including a shaft journaled on the frame transversely of the line of draft of the harrow, a crank arm on one end of said shaft, one wheel being journaled on said crank arm, a second crank arm pivoted on the frame, the other wheel being journaled on the crank arm, a lever on the shaft, a link between the lever and second crank arm, means to turn the shaft, the lever and linkage between the shaft and second crank arm being such as to reduce the extent of the throw of the second crank arm relative to the first crank arm with the turning movement of the shaft.

VIRGIL GIER.